US012782559B2

(12) United States Patent
Chang

(10) Patent No.: US 12,782,559 B2
(45) Date of Patent: Nov. 3, 2026

(54) OPTICAL SENSING APPARATUS

(71) Applicant: Artilux, Inc., Menlo Park, CA (US)

(72) Inventor: Chun-Wei Chang, Hsinchu County (TW)

(73) Assignee: Artilux, Inc., Menlo Park, CA (US)

( * ) Notice: Subject to any disclaimer, the term of this patent is extended or adjusted under 35 U.S.C. 154(b) by 618 days.

(21) Appl. No.: 18/364,193

(22) Filed: Aug. 2, 2023

(65) Prior Publication Data

US 2024/0103164 A1 Mar. 28, 2024

Related U.S. Application Data

(60) Provisional application No. 63/410,235, filed on Sep. 27, 2022.

(51) Int. Cl.

*G01S 17/04* (2020.01)
*G01S 7/481* (2006.01)
*G01S 7/4913* (2020.01)
*G01S 17/88* (2006.01)

(52) U.S. Cl.

CPC ............ *G01S 17/04* (2020.01); *G01S 7/4816* (2013.01); *G01S 7/4913* (2013.01); *G01S 17/88* (2013.01)

(58) Field of Classification Search

CPC ...... G01S 17/04; G01S 7/4816; G01S 7/4913; G01S 17/88; G01S 7/4873; G01S 2007/4975; G01S 7/4815; G01S 7/497

See application file for complete search history.

(56) References Cited

U.S. PATENT DOCUMENTS 7,446,316 B2 11/2008 Kilgore et al.
9,687,671 B2 6/2017 Weckwerth et al.
2007/0106160 A1* 5/2007 Kilgore ................ G06V 10/143 600/473
2007/0118028 A1* 5/2007 Kitajima ................ A61B 5/681 600/310
2012/0018637 A1 1/2012 Mitani
2012/0138771 A1* 6/2012 Li ........................ G06F 3/03547 250/206.1
2012/0199728 A1* 8/2012 Momtahan .............. G06F 3/042 250/221
2015/0309647 A1* 10/2015 Lu ........................ G06F 3/04162 345/175

(Continued)

FOREIGN PATENT DOCUMENTS

CN 107820410 12/2019

*Primary Examiner* — Yuqing Xiao
*Assistant Examiner* — Jempson Noel
(74) *Attorney, Agent, or Firm* — Dority & Manning, P.A.

(57) ABSTRACT

Methods and apparatuses for detecting an object are described herein. The apparatus includes a light receiver configured to receive at least two lights with a first wavelength and a second wavelength. The apparatus also includes a memory configured to store a plurality of adjusting parameters, and a processor configured to compare a first reference light intensity at the first wavelength and a second reference light intensity at the second wavelength without a presence of the object to obtain a condition index, access a corresponding adjusting parameter from the memory according to the condition index for adjusting a threshold, and compare a reflected light intensity reflected from the object with the adjusted threshold to determine a detection information.

20 Claims, 5 Drawing Sheets

(56) References Cited

U.S. PATENT DOCUMENTS

| | | | | |
|---|---|---|---|---|
| 2016/0026212 | A1* | 1/2016 | Lee | G06F 1/3231<br>361/679.03 |
| 2017/0215747 | A1 | 8/2017 | van Dinther et al. | |
| 2017/0359635 | A1 | 12/2017 | Aumer et al. | |
| 2022/0120896 | A1* | 4/2022 | Theiler | G01J 1/4204 |
| 2022/0225006 | A1 | 7/2022 | Allec et al. | |

* cited by examiner

| contamination (Mn) | condition index R(Mn) | adjusting parameter Pn |
|---|---|---|
| M1: wet sunscreen | R(M1) | P1 |
| M2: dry sunscreen | R(M2) | P2 |
| M3: wet lotion | R(M3) | P3 |
| M4: dry lotion | R(M4) | P4 |
| M5: earwax 1 | R(M5) | P5 |
| ... | ... | ... |
| Mn: earwax 2 | R(Mn) | Pn |

FIG. 4

OPTICAL SENSING APPARATUS

CROSS-REFERENCE TO RELATED APPLICATIONS

This patent application claims priority to Provisional Patent Application No. 63/410,235, filed Sep. 27, 2022, the contents of which are incorporated herein by reference in their entirety.

FIELD

The present application is related to optical sensors, and in particular an electronic device that uses optical sensors with at least two wavelength bands to detect the presence of an object.

BACKGROUND

Optical sensors are being used in many systems, such as smartphones, wearable electronics, robotics, and autonomous vehicles, etc. for proximity detection, 2D/3D imaging, object recognition, image enhancement, material recognition, color fusion, health monitoring, and other relevant applications. In some scenarios, the optical sensor is operated to detect the proximity to the object. Accordingly, it is challenging for the accuracy of detection.

SUMMARY OF THE INVENTION

The present disclosure discloses an electronic device with an optical sensing apparatus which utilizes one or more optical detectors with at least two wavelength bands to detect the presence of an object. In this way, the electronic device with the optical sensing apparatus can switch its various functions in a smarter way according to the detection result. The optical sensing apparatus can be operable for different wavelength ranges, including visible light (e.g., wavelength range 380 nm to 780 nm, or a similar wavelength range as defined by a particular application) and non-visible light. The non-visible light includes near-infrared (NIR, e.g., wavelength range from 780 nm to 1400 nm, or a similar wavelength range as defined by a particular application) and short-wavelength infrared (SWIR, e.g., wavelength range from 1400 nm to 3000 nm, or a similar wavelength range as defined by a particular application) light.

When the electronic device is used multiple times or placed in different environments, contaminants may appear on the surface of the optical sensing apparatus or electronic device. When the electronic device is worn on the user, contaminants may interfere with the measured reflected light. Therefore, the information of presence of an object detected by the electronic device may be inaccurate, thereby affecting the user experience. It would be desirable for the electronic device to dynamically calibrate the threshold depending on the condition of the electronic device.

Optical sensors can emit light and receive reflected light. When an object is not present, the electronic device can use reflected light to detect contaminants on optical sensors. Based on these detected contaminants, distance thresholds for detecting an object with the optical sensor (e.g., detecting a user) can be adjusted to enable the electronic device to properly detect objects via the optical sensors despite the presence of these contaminants.

Aspects of the present disclosure are described herein.

One aspect of the present disclosure is directed to an optical sensing apparatus configured to detect an object. The apparatus includes a light receiver configured to receive at least two lights with a first wavelength and a second wavelength. The apparatus also includes a memory configured to store a plurality of adjusting parameters, and a processor configured to compare a first reference light intensity at the first wavelength and a second reference light intensity at the second wavelength without a presence of the object to obtain a condition index, access a corresponding adjusting parameter from the memory according to the condition index for adjusting a threshold, and compare a reflected light intensity reflected from the object with the adjusted threshold to determine a detection information.

In some implementations, the optical sensing apparatus further includes a light transmitter configured to emit at least two lights with the first wavelength and the second wavelength.

In some implementations, the light receiver includes a first photoelectronic device configured to receive a first light with the first wavelength and a second photoelectronic device configured to receive a second light with the second wavelength.

In some implementations, the second wavelength is larger than the first wavelength.

In some implementations, the processor indicates the detection information as close distance when the reflected light intensity is greater than the adjusted threshold.

In some implementations, the processor is configured to adjust another threshold by the corresponding adjusting parameter and indicate the detection information as far distance when the reflected light intensity is less than the adjusted another threshold.

In some implementations, the adjusted threshold is determined by multiplying corresponding adjusting parameter by the threshold.

In some implementations, the first wavelength is in a range of NIR light, the second wavelength is in a range of SWIR light.

In some implementations, the condition index is obtained by calculating a ratio of the first reference light intensity to the second reference light intensity.

In some implementations, the memory includes a look-up table used to store a plurality of adjusting parameters.

In some implementations, the optical sensing apparatus further includes a housing in which the light receiver, the memory, and the processor are accommodated.

In some implementations, the processor is implemented by digital processor, application-specific integrated circuit, digital circuitry, or software module.

Another aspect of the present disclosure is directed to an electronic device. The electronic device includes, including the optical sensing apparatus described above, wherein the electronic device can operate in normal operating mode or power saving mode according to the detection information.

In some implementations, the electronic device is an earphone, a wristwatch, or a head-mount device.

Another aspect of the present disclosure is directed to a method of indicating a detection information by an optical sensing apparatus. The method includes receiving a first reference light intensity at a first wavelength and a second reference light intensity at the second wavelength at a first time without a presence of the object by a light receiver, comparing the first reference light intensity and the second reference light intensity to obtain a condition index by a processor, and accessing a corresponding adjusting parameter from a memory according to the condition index for adjusting thresholds, and comparing a reflected light intensity with the adjusted thresholds to determine a detection information.

In some implementations, the corresponding adjusting parameter is accessed from a lookup table stored in the memory.

In some implementations, the method includes transmitting a testing light with the first wavelength to the object by a light transmitter, wherein a portion of testing light is reflected from the object toward the light receiver.

In some implementations, the condition index is obtained by calculating a ratio of the first reference light intensity to the second reference light intensity.

In some implementations, the processor indicates different detection information according to different adjusted thresholds.

In some implementations, the optical sensing apparatus is included in an electronic device, wherein the electronic device is an earphone, a wristwatch, or a head-mount device.

BRIEF DESCRIPTION OF THE DRAWINGS

The foregoing aspects and many of the advantages of this application will become more readily appreciated as the same becomes better understood by reference to the following detailed description, when taken in conjunction with the accompanying drawings:

FIG. 4 illustrates a look-up table stored in the memory in accordance with one embodiment of the present disclosure.

DETAILED DESCRIPTION

Figure 1:
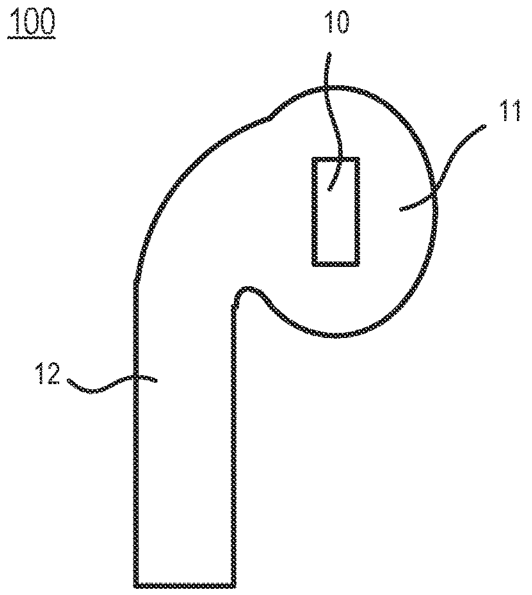
FIG. 1 illustrates a view of an electronic device in accordance with one embodiment of the present disclosure.

The following embodiments accompany the drawings to illustrate the concept of the present disclosure. In the drawings or descriptions, similar or identical parts use the same reference numerals, and in the drawings, the shape, thickness or height of the element is can be reasonably expanded or reduced. The embodiments listed in the present application are only used to illustrate the present application and are not used to limit the scope of the present application. Any obvious modification or change made to the present application does not depart from the spirit and scope of the present application.

An electronic device (e.g., earphones, AR/VR wearable equipment, etc.) has a plurality of functions and/or a plurality of operating modes. When the electronic device is worn on the user or removed from the user, it can operate in different operating modes to meet the user's experience. For example, when the electronic device is removed from the user, it can operate in a power saving mode. When the electronic device is worn on the user, it can operate in a normal operating mode. An optical sensing apparatus can be arranged on the electronic device to receive the reflected light from the user, and compare the reflected light intensity with a threshold to determine whether the electronic device is worn on the user. When the electronic device is used multiple times or placed in different environments, contaminants may appear on the surface of the optical sensing apparatus or electronic device. When the electronic device is worn on the user, contaminants may interfere with the measured reflected light. Therefore, the information of presence of an object detected by the electronic device may be inaccurate, thereby affecting the user experience. It would be desirable for the electronic device to dynamically calibrate the threshold depending on the condition of the electronic device.

FIG. 1 shows a view of an electronic device 100 in accordance with one embodiment of the present disclosure. The electronic device 100 can be a wearable device or a portable device. The wearable device can be an earphone, a wristwatch, a head-mounted device, or other wearable electronic device. The portable device can be cellular telephone, tablet computer, laptop computer, computer mouse, computer stylus, or other accessories. The electronic device 100 shown in FIG. 1 is described herein as an example of an earphone. The electronic device 100 includes a main body 11 and an optical sensing apparatus 10 arranged in the main body 11. The main body 11 is configured for proximity to or in contact with an object, such as skin. Optionally, the electronic device 100 can include a protruding portion 12 connecting to the main body 11. In the example of the earphone, the main body 11 can be placed in the user's ear to play the audio.

Figure 2:
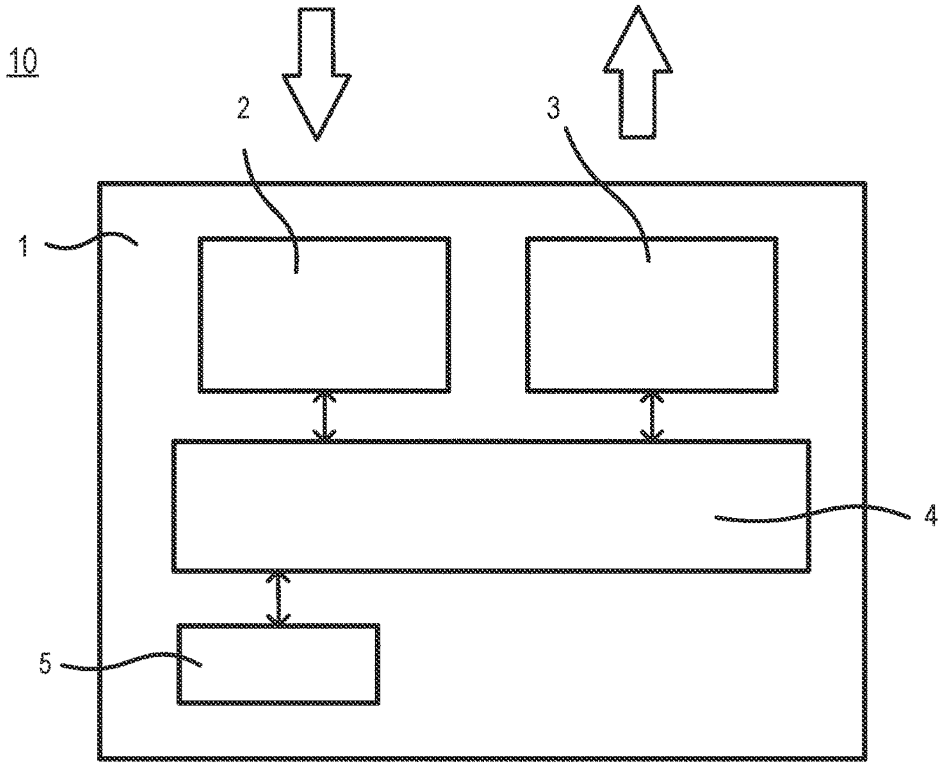
FIG. 2 illustrates a schematic diagram of an optical sensing apparatus in accordance with one embodiment of the present disclosure.

FIG. 2 shows a schematic diagram of an optical sensing apparatus 10 in accordance with one embodiment of the present disclosure. The optical sensing apparatus 10 includes a light receiver 2, a light transmitter 3, a processor 4, and a memory 5 which are located in a housing 1. The light transmitter 3 includes a multi-band light emitter and is configured to emit at least two lights with different wavelengths. In an embodiment, a first light emitted from the light transmitter 3 has a first peak wavelength W1 to detect the presence of the object. The second light emitted from the light transmitter 3 has a second peak wavelength W2 larger than the first peak wavelength W1 to enhance the accuracy of detection. For example, the first light is NIR and has a first reflectivity relative to the skin. The second light is SWIR and has a second reflectivity relative to the skin, where the second reflectivity is lower than the first reflectivity.

The light receiver 2 includes a multi-band optic detector and is configured to receive at least two lights at different wavelengths which correspond to the lights emitted from the light transmitter 3. The processor 4 is coupled to the light receiver 2 and the light transmitter 3. The memory 5 is coupled to the processor 4. The memory 5 includes a look-up table to store a plurality of adjusting parameters for dynamically adjusting thresholds.

The processor 4 is configured to control the activation of the optical receiver 2 and the optical transmitter 3, process the received light intensity from the optical receiver 2, access the adjusting parameters from the memory 5, dynamically adjust the thresholds to indicate the object detection.

The light receiver 2 can include a single photoelectronic device or a plurality of photoelectronic devices arranged in an array. In an embodiment, the light receiver 2 includes a plurality of photoelectronic devices configured to receive a plurality of lights with different wavelengths. In another embodiment, the light receiver 2 can include an electronic component electrically connected to the photoelectronic device for transmitting signal or providing power. The electronic component can include resistor, capacitor, inductor, or integrated circuit (IC). The photoelectronic device can include a supporting substrate and a detecting region supported by the supporting substrate. The detecting region can include germanium (Ge) or a material compound in the III-V group (e.g., GaAs), and is configured to absorb photons. The supporting substrate can include a material, such as silicon, different from that of the detecting region. The light receiver 2 can detect the visible light, or the non-visible light according to the application. The visible light can include blue, navy, green, yellow, or red light. The non-visible light can include NIR or SWIR.

The light transmitter 3 can be a semiconductor light-emitting element, such as a light-emitting diode (LED), a laser diode, or organic light-emitting diode (OLED). The light transmitter 3 can emit a light corresponding to the detecting wavelength of the light receiver 2. The processor 4 can be implemented by digital processor (DSP), general purpose processor, application-specific integrated circuit (ASIC), digital circuitry, software module, or any combinations thereof.

Figure 3A:
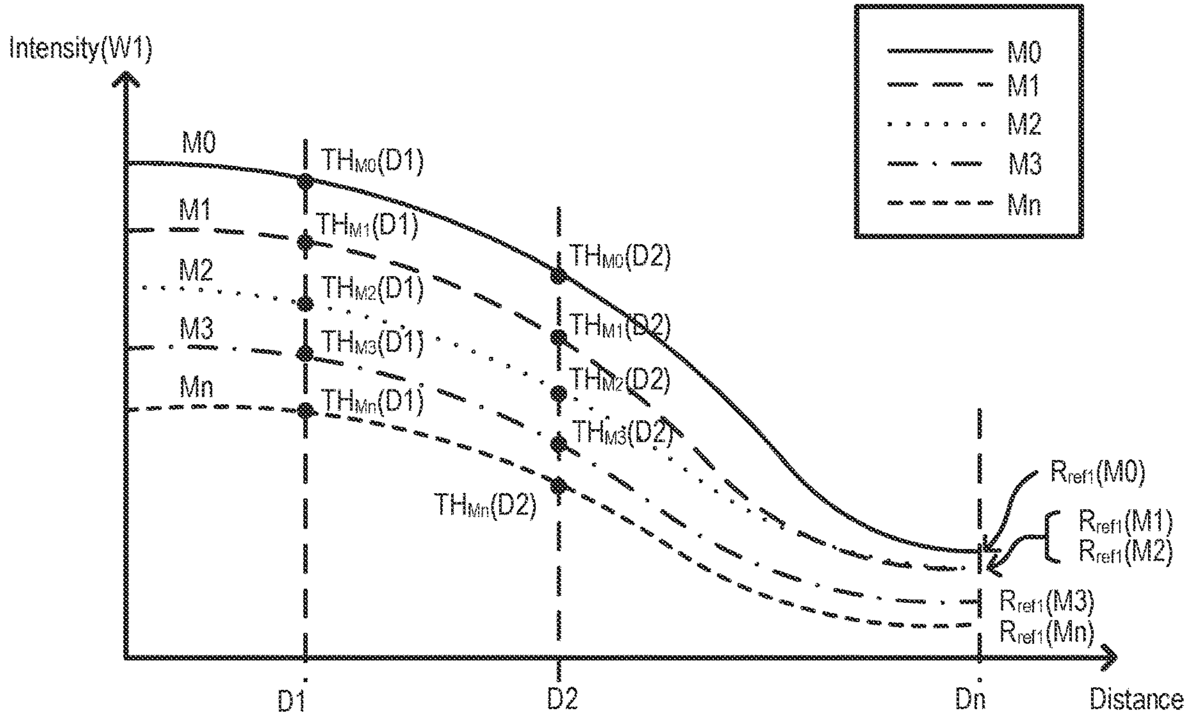
FIGS. 3A-3B illustrate diagrams showing the variation of the received light intensity of the optical sensing apparatus in accordance with an embodiment of the present disclosure.
Figure 3B:
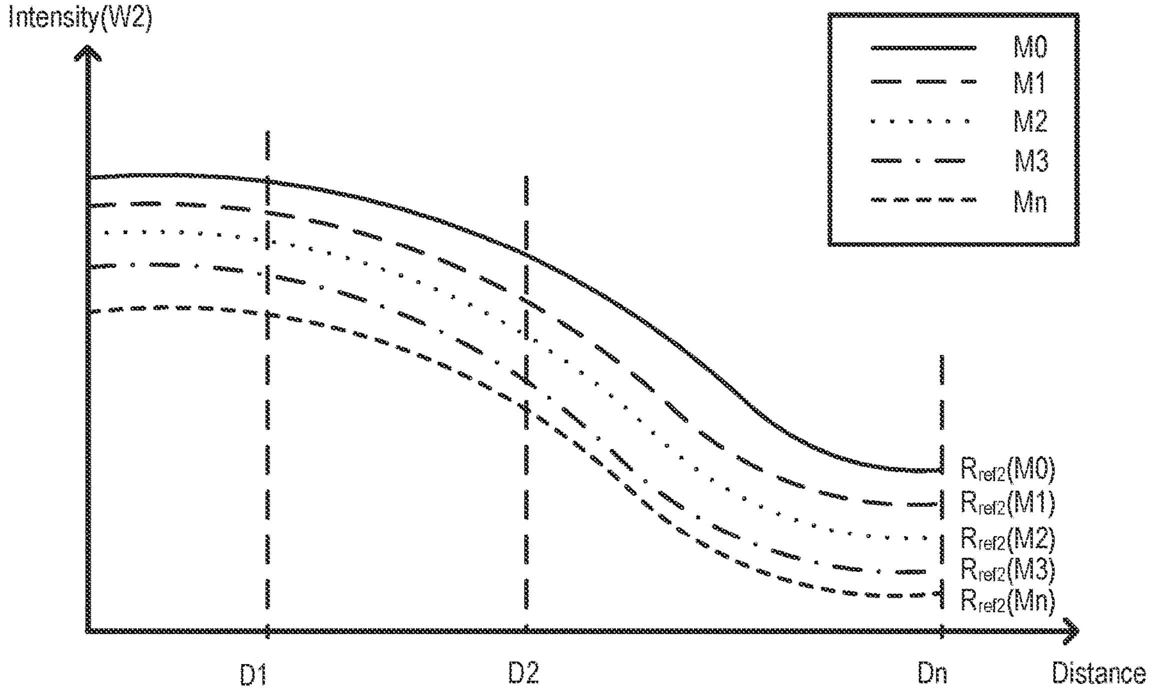

FIGS. 3A-3B illustrate diagrams showing the variation of the received light intensity of the optical sensing apparatus 10 in accordance with an embodiment of the present disclosure. FIG. 3A shows the variation of the received light intensity of the optical sensing apparatus 10 when the optical sensing apparatus 10 operates at wavelength W1 which is used to detect the presence of an object. FIG. 3B shows the received light intensity of the optical sensing apparatus 10 when the optical sensing apparatus 10 operates at wavelength W2 which is used to enhance the accuracy of detection. Each line represents the light receiver receiving the reflected light intensity at different distances between the optical sensing apparatus 10 (or electronic device 100) and the object under various conditions. In general, the reflected light intensity is lower with further distance. Distance D1 represents the electronic device 100 is in proximity to the object, for example the earphone is placed in the ear. Distance D2 represents the electronic device is removed from the object, for example the earphone is removed from the ear. Distance Dn represents the electronic device 100 is far away from the object, for example the optical path of the electronic device 100 is not pointed towards the user. In this condition, the light receiver 2 receives little or no reflected light from the object and may detect a reference light from the ambient. The line M0 represents that there is no contamination on the outer surface of the optical sensing apparatus 10 (or electronic device 100). Different lines M1~Mn represent light received by the optical sensing apparatus 10 that correspond to different contaminations on the outer surface of the optical sensing apparatus 10 (or electronic device 100). Referring to line M0 in FIG. 3A, when the outer surface of the optical sensing apparatus 10 is clean and not covered by contamination, the optical sensing apparatus 10 can measure a reflected light intensity THM0 (D1) at distance D1, a reflected light intensity THM0(D2) at distance D2, and a reference light intensity Rref1(M0) at distance Dn. THM0(D1) can be set as a default threshold for close distance or presence of the object. $TH_{M0}$(D2) can be set as a default threshold for far distance or distant from the object. Therefore, the processor 4 can continuously compare a reflected light intensity with the default thresholds $TH_{M0}$ (D1) and $TH_{M0}$(D2) to determine the presence of the object (e.g., whether a user has put on or removed the earphone). When the reflected light intensity is greater than the default threshold $TH_{M0}$(D1), the processor 4 indicates the distance as D1 which means the presence of the object and outputs the detection result as "ON" to switch the electronic device 100 to an operating mode (e.g., start playing music, start detecting heartrate, etc.). When the reflected light intensity is less than the default threshold $TH_{M0}$(D2), the processor 4 indicates the distance as D2 which means distant from the object and outputs the detection result as "OFF" to switch the electronic device 100 to a power saving mode (e.g., stop playing music, stop detecting heartrate, etc.).

When the outer surface of the optical sensing apparatus 10 is covered by different contaminations, the received light intensity at D1, D2 will vary with different contaminations. If the threshold is not calibrated, the distance D1, D2 might vary with different contaminations, which would yield undesirable user experience. For example, if the processor 4 uses the fixed default thresholds $TH_{M0}$(D1), $TH_{M0}$(D2) to compare with the reflected light intensity, the processor 4 under condition M1 would not output the detection result as "ON" at D1 because the received light intensity cannot reach $TH_{M0}$(D1). Therefore, the electronic device 100 cannot correctly detect the presence of the object and switch to the correct operating mode. To help avoid inaccurate detection information, it is desirable for the processor 4 to dynamically adjust the thresholds with the different contaminations. For example, if the contamination M2 covers on the electronic device 100, the processor 4 should dynamically adjust the default thresholds $TH_{M0}$(D1), $TH_{M0}$(D2) to be $TH_{M2}$ (D1), $TH_{M2}$(D2) for comparing with the reflected light intensity to obtain the accurate detection information. As shown in FIG. 3A, the reference light intensity $R_{ref1}$ (M1~Mn) at distance Dn is varied with different contaminations. The reference light intensity $R_{ref1}$(M1~Mn) can be measured at a time without the presence of the object, for example the optical path of the electronic device 100 is not pointed towards the user. Ideally, the processor 4 can tell what contamination is on the electronic device according to $R_{ref1}$(M1~Mn) and dynamically adjust the appropriate thresholds to indicate the detection information when the electronic device operates at wavelength W1. However, some received light intensity $R_{ref1}$(M1~Mn) are similar to each other or similar to $R_{ref1}$(M0), for example the received light intensity $R_{ref1}$(M1) and $R_{ref1}$(M2) are similar to each other as shown in FIG. 3A. Therefore, the processor 4 cannot distinguish which contamination M1, M2 is on the electronic device. Hence, the processor 4 cannot dynamically adjust the appropriate thresholds to compare with reflected light intensity and cannot accurately indicate the detection information of the presence of the object when the electronic device operates at wavelength W1.

As shown in FIG. 3B, the optical sensing apparatus 10 operates at wavelength W2 which is different than wavelength W1, for example in the SWIR band. The reference light intensities $R_{ref2}$(M1~Mn) could vary with different contaminations. In this example, the reference light intensity $R_{ref2}$(M1) and $R_{ref2}$(M2) are different from each other, and therefore the processor 4 can use this data to determine what the contamination is and to dynamically adjust the appropriate thresholds to detect the presence of the object. When the electronic device operates at wavelength W2, the reference light intensity $R_{ref2}$(M1~Mn) at the distance Dn can be measured at a time without the presence of the object. In some implementations, the reference light intensity $R_{ref2}$ (M1~Mn) is lower than the reference light intensity $R_{ref1}$ (M1~Mn) because light with the wavelength W2 is absorbed more by the material of the detected object or the environment. The processor 4 can compare the $R_{ref1}$ and $R_{ref2}$ to obtain a condition index for accurately judging what the contamination is on the electronic device 100 and dynamically adjusting the appropriate thresholds to indicate the accurate detection information. In an embodiment, the condition index is obtained by calculating a ratio $R_{ref1}/R_{ref2}$. In another embodiment, the condition index is obtained by calculating the difference between $R_{ref1}$ and $R_{ref2}$. The condition index is not limited by the aforementioned methods and can be obtained by other mathematical calculation methods.

FIG. 4 illustrates a look-up table stored in the memory 5 in accordance with one embodiment of the present disclosure. The look-up table shows the relationship of the condition index R(Mn) and adjusting parameter Pn of corresponding contamination Mn. The processor 4 can calculate a condition index R(Mn) at a time without the presence of the object. Then, the processor 4 can access the adjustment parameter Pn from the look-up table according to the condition index R(Mn) to dynamically adjust the thresholds for comparing with the reflected light intensity to indicate the detection information. Take the contaminant M1 as an example, the contaminant M1 is wet sunscreen covering on the optical sensing apparatus 10 (or electronic device 100). The optical sensing apparatus 10 measures the $R_{ref1}$(M1) and $R_{ref2}$(M1) at a time without presence of the object. The processor 4 can obtain the condition index R(M1), and access the adjusting parameter P1 from the look-up table stored in the memory 5 according to the R(M1). Subsequently, the processor 4 can dynamically adjust the default threshold $TH_{M0}$(D1) to be $TH_{M1}$(D1) and the default threshold $TH_{M0}$(D2) to be $TH_{M1}$(D2) (e.g., $TH_{M1}$(D1) and $TH_{M1}$(D2) in FIG. 3A). For example, $TH_{M1}$(D1)=P1×$TH_{M0}$(D1), $TH_{M1}$(D2)=P1×$TH_{M0}$(D2). Then, the processor 4 can continuously compare the reflected light intensity with the adjusted thresholds $TH_{M1}$(D1) and $TH_{M1}$(D2) to indicate the detection information. As shown in FIG. 4, the look-up table includes a plurality of adjusting parameters Pn which can correspond to the condition index R(Mn) of different contaminations, such as wet sunscreen, dry sunscreen, wet lotion, dry lotion, user's earwax, or other contaminations.

Figure 5:
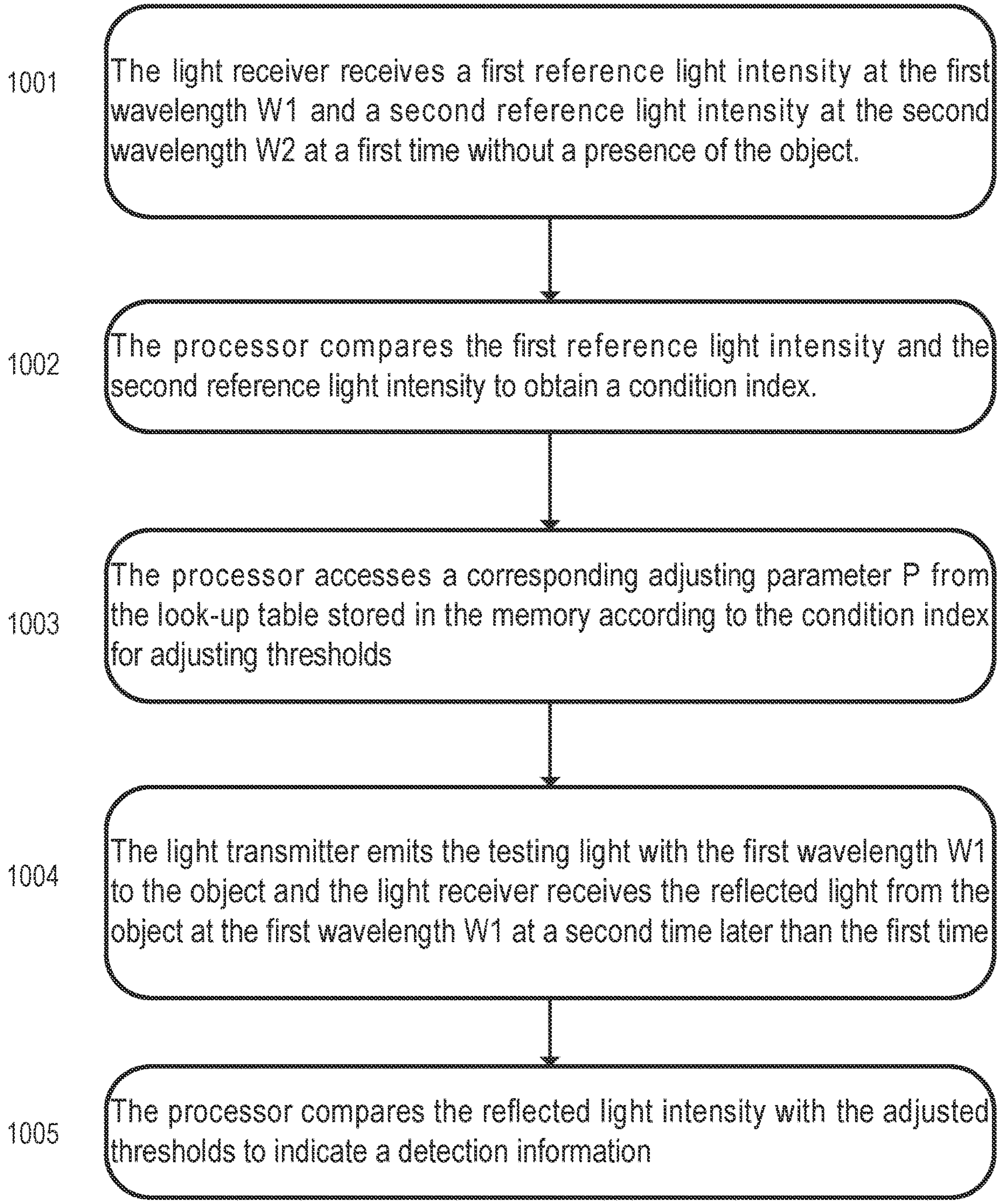
FIG. 5 illustrates steps of indicating a detection information by an optical sensing apparatus in accordance with one embodiment of the present disclosure.

FIG. 5 illustrates steps of indicating a detection information by an optical sensing apparatus in accordance with one embodiment of the present disclosure. Step 1001 illustrates the light receiver 2 receives a first reference light intensity at the first wavelength W1 and a second reference light intensity at the second wavelength W2 at a first time without a presence of the object. Step 1002 illustrates the processor 4 compares the first reference light intensity and the second reference light intensity to obtain a condition index. Step 1003 illustrates the processor 4 accesses a corresponding adjusting parameter P from the look-up table stored in the memory 5 according to the condition index for adjusting thresholds. Step 1004 illustrates the light transmitter 3 emits the testing light with the first wavelength W1 to the object and the light receiver 2 receives the reflected light from the object at the first wavelength W1 at a second time later than the first time. In detail, the reflected light is a portion of testing light reflected from the object and toward the light receiver. Step 1005 illustrates the processor 4 compares the reflected light intensity with the adjusted thresholds to indicate a detection information.

Figure 6:
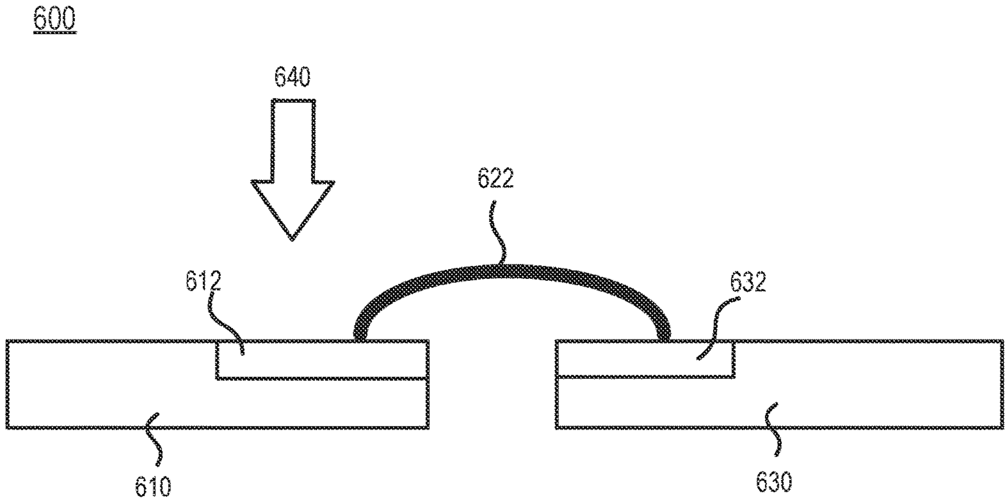
FIG. 6 illustrates an optical sensor in accordance with one embodiment of the present disclosure.

FIG. 6 illustrates an optical sensor 600, which can be an example of the light receiver 2. An optical sensor 600 includes a first substrate 610 and a second substrate 630. The first substrate 610 includes a sensing area 612 (e.g., III-V material) that is electrically coupled to sensing circuitry 632 (e.g., CMOS circuitry) of the second substrate 630 via wire(s) 622 (e.g., wire-bonded).

Figure 7:
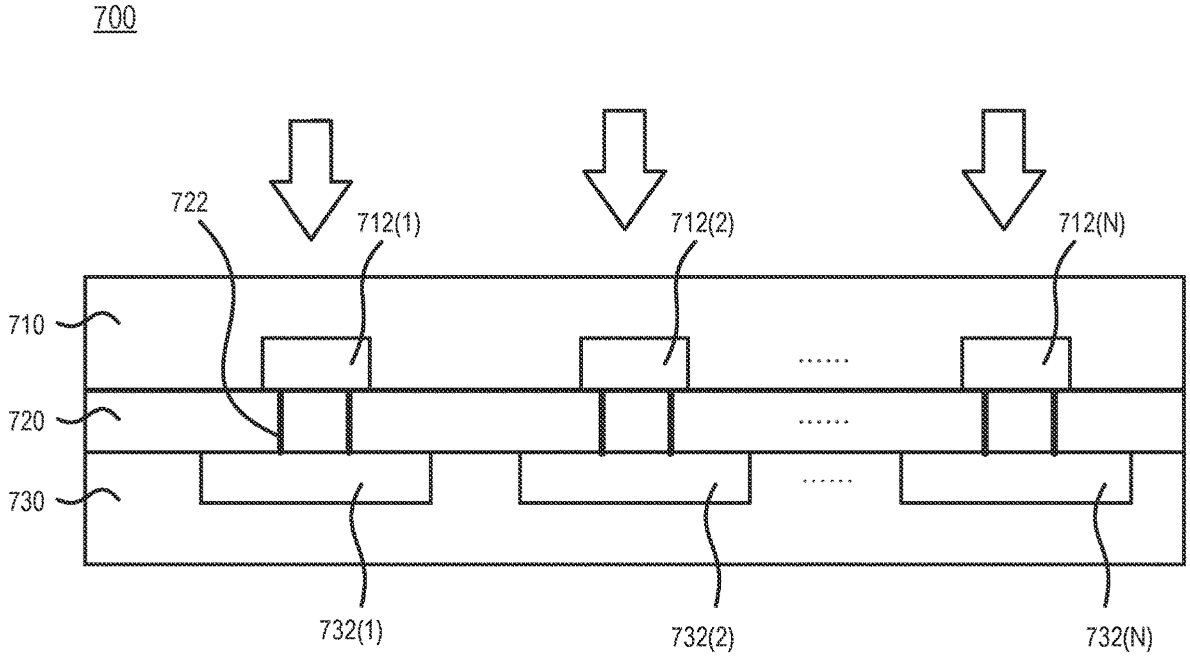
FIG. 7 illustrates an optical sensor in accordance with another embodiment of the present disclosure.

FIG. 7 illustrates an optical sensor 700, which can be another example of the light receiver 2. The optical sensor 700 includes a first substrate 710 and a second substrate 730, which can both be silicon substrate. The first substrate 710 and the second substrate 730 are wafer-bonded via a bonding interface 720 (e.g., oxide or any other suitable materials). The first substrate 710 includes multiple sensing areas 712(1)~712(N), where Nis a positive integer. In some implementations, the multiple sensing areas 712(1)~712(N) may be comprised of germanium that is deposited on the first substrate 710. The second substrate 730 includes multiple corresponding circuitry areas 732(1)~732(N). The multiple sensing areas 712(1)~712(N) and the multiple corresponding circuitry areas 732(1)~732(N) are electrically coupled through the bonding interface 720 via wires 722.

While the disclosure has been described by way of example and in terms of a preferred embodiment, it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An optical sensing apparatus configured to detect an object, comprising:

a light receiver configured to receive at least two lights with a first wavelength and a second wavelength;

a memory configured to store a plurality of adjusting parameters; and a processor configured to:

compare a first reference light intensity at the first wavelength and a second reference light intensity at the second wavelength without a presence of the object and with a presence of a first contaminant on a surface of the optical sensing apparatus to obtain a first condition index;

access a first adjusting parameter from the memory according to the first condition index for adjusting a threshold;

update the threshold to be a first adjusted threshold according to the first adjusting parameter:

compare a first reflected light intensity reflected from the object with the first adjusted threshold to determine a first detection information;

compare a third reference light intensity at the first wavelength and a fourth reference light intensity at the second wavelength without the presence of the object and with a presence of a second contaminant on the surface of the optical sensing apparatus to obtain a second condition index;

access a second adjusting parameter from the memory according to the second condition index for adjusting the threshold;

update the threshold to be a second adjusted threshold according to the second adjusting parameter; and compare a second reflected light intensity reflected from the object with the second adjusted threshold to determine a second detection information.

2. The optical sensing apparatus of claim 1, further comprising a light transmitter configured to emit the at least two lights with the first wavelength and the second wavelength.

3. The optical sensing apparatus of claim 1, wherein the light receiver comprises a first photoelectronic device configured to receive a first light with the first wavelength and a second photoelectronic device configured to receive a second light with the second wavelength.

4. The optical sensing apparatus of claim 1, wherein the second wavelength is larger than the first wavelength.

5. The optical sensing apparatus of claim 1, wherein the processor indicates the first detection information as close distance when the first reflected light intensity is greater than the first adjusted threshold.

6. The optical sensing apparatus of claim 1, wherein the processor is configured to adjust an additional threshold by the first adjusting parameter to obtain an adjusted additional threshold, and indicate the first detection information as far distance when the first reflected light intensity is less than the adjusted additional threshold.

7. The optical sensing apparatus of claim 1, wherein the first adjusted threshold is determined by multiplying the first adjusting parameter by the threshold.

8. The optical sensing apparatus of claim 1, wherein the first wavelength is in a range of NIR light, the second wavelength is in a range of SWIR light.

9. The optical sensing apparatus of claim 1, wherein the first condition index is obtained by calculating a ratio of the first reference light intensity to the second reference light intensity.

10. The optical sensing apparatus of claim 1, wherein the memory comprises a look-up table used to store the plurality of adjusting parameters.

11. The optical sensing apparatus of claim 1, further comprising a housing in which the light receiver, the memory, and the processor are accommodated.

12. The optical sensing apparatus of claim 1, wherein the processor is implemented by a digital processor, an application-specific integrated circuit, a digital circuitry, or a software module.

13. An electronic device, comprising, the optical sensing apparatus of claim 1; and wherein the electronic device operates in normal operating mode or power saving mode according to at least one of the first detection information and the second detection information.

14. The electronic device of claim 13, wherein the electronic device comprises an earphone, a wristwatch, or a head-mount device.

15. A method of indicating a detection information of an object by an optical sensing apparatus, comprising:

receiving a first reference light intensity at a first wavelength and a second reference light intensity at a second wavelength at a first time without a presence of the object and with a presence of a first contaminant on a surface of the optical sensing apparatus by a light receiver;

comparing the first reference light intensity and the second reference light intensity to obtain a first condition index by a processor;

accessing a first adjusting parameter from a memory according to the first condition index for adjusting a threshold;

updating the threshold to be a first adjusted threshold according to the first adjusting parameter;

comparing a first reflected light intensity reflected from the object with the first adjusted threshold to determine a first detection information;

comparing a third reference light intensity at the first wavelength and a fourth reference light intensity at the second wavelength without the presence of the object and with a presence of a second contaminant on the surface of the optical sensing apparatus to obtain a second condition index:

accessing a second adjusting parameter from the memory according to the second condition index for adjusting the threshold;

updating the threshold to be a second adjusted threshold according to the second adjusting parameter; and comparing a second reflected light intensity reflected from the object with the second adjusted threshold to determine a second detection information.

16. The method of claim 15, wherein the first adjusting parameter and the second adjusting parameter are accessed from a lookup table stored in the memory.

17. The method of claim 15, further comprising transmitting a testing light with the first wavelength to the object by a light transmitter, wherein a portion of the testing light is reflected from the object toward the light receiver.

18. The method of claim 15, wherein the first condition index is obtained by calculating a ratio of the first reference light intensity to the second reference light intensity.

19. The method of claim 15, wherein the processor indicates different detection information according to different adjusted thresholds.

20. The method of claim 15, wherein the optical sensing apparatus is included in an electronic device, wherein the electronic device is an earphone, a wristwatch, or a head-mount device.

* * * * *